Dec. 14, 1948.  A. M. BOUDREAU  2,456,250
COMBINED BRAKE AND SAFETY LEG FOR PERAMBULATORS
Filed Nov. 13, 1946  2 Sheets-Sheet 2

INVENTOR.
Alban M. Boudreau
BY his Atty.
John H. McKenna

Patented Dec. 14, 1948

2,456,250

UNITED STATES PATENT OFFICE 2,456,250

COMBINED BRAKE AND SAFETY LEG FOR PERAMBULATORS

Alban M. Boudreau, Gardner, Mass., assignor to Hedstrom-Union Company, Gardner, Mass., a corporation of Massachusetts Application November 13, 1946, Serial No. 709,484

8 Claims. (Cl. 188—20)

This invention relates to improvements in perambulators and more particularly to an improved brake mechanism therefor including a safety leg structure which is operable in conjunction with the brake.

It is among the objects of the invention to provide a brake mechanism which is operable both to apply the brake and to release the brake in response to depression by the foot of the same actuating element.

Another object is to provide a combined brake and safety leg in which a pivoted stiff lever has a relatively short lever arm for engaging a wheel as a brake and has a relatively longer arm for actuating the shorter arm forcibly into braking engagement with the wheel and constituting also a safety leg whenever the wheel is braked.

Yet another object is to provide a brake for the rear wheel of a vehicle comprising a generally W-shaped stiff frame disposed between the rear wheels with the bridge end of the W-frame rearward of the axis of the wheels and with the free ends of the W-arms of the frame forward of the wheels, the W-frame being pivotally mounted for movement of said free ends of the W-arms into braking engagement with the wheels in response to depression of the bridge end of the frame, and there being means biasing the frame in one direction about its pivot and a latch for releasably securing the frame when its bridge end is depressed.

A further object is to provide a combined brake and safety leg for a perambulator comprising a generally U-shaped pivotally mounted stiff bar having brake members at the free end portions of the U-arms of the frame and having the bridge end of the W-frame disposed at a substantial leverage distance from the pivot for forcible actuation of the brake members and for constituting a safety leg when said brake members are in braking engagement with wheels of the perambulator.

A still further object is to provide a generally W-shaped frame pivotally disposed between the rear wheels of the perambulator with the bridge end of the frame rearward of the rear axle and with the free ends of the W-arms forward of the rear wheels and swingable into braking engagement therewith in response to depression of the bridge end of the frame.

Another object is to provide a perambulator brake and safety leg mechanism comprising an integral stiff bar bent into a generally W-shaped frame and pivotally mounted between the rear wheels of the perambulator, with portions of the frame forward of the rear wheels engageable therewith as brakes and with a brake actuating portion extending rearward and adapted to prevent backward tipping of the perambulator when the brakes are applied, there being a gravity actuated latch for releasably securing the frame in brake-applying position.

It is, moreover, my purpose and object generally to improve the structure and effectiveness of perambulator brakes in conjunction with a safety leg against backward tipping of the perambulator.

Figure 1:
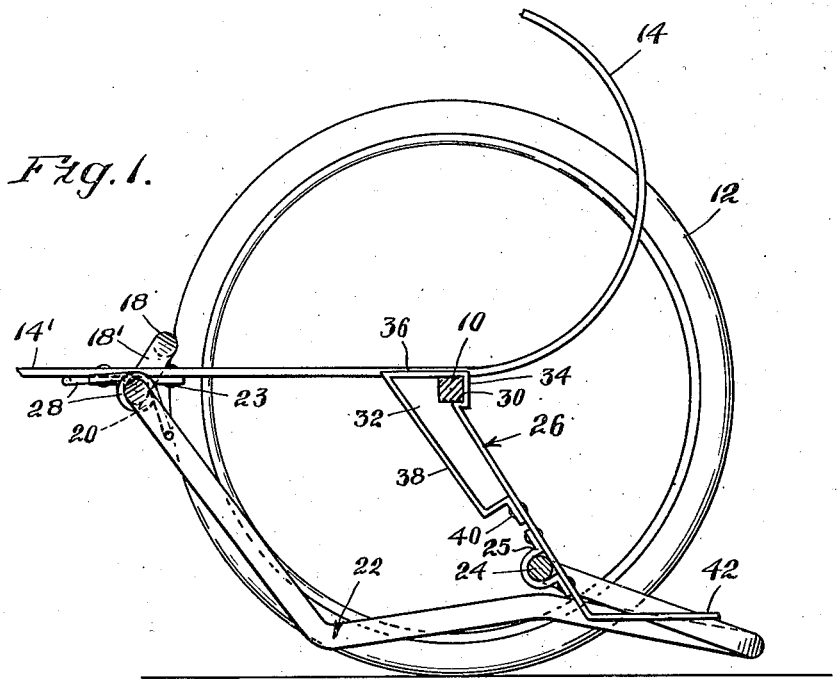
Fig 1 is a cross-sectional view of the rear end of the perambulator chassis having features of the invention embodied thereon, the section being on line 1—1 of Fig. 3, and the brake being in braking engagement with the wheel.

Referring to the drawings, the axle 10 and wheels 12 are representative of the rear axle and rear wheels of a perambulator of any type, and the two springs 14, secured to the axle at 16, are representative of any suitable means extending as at 14' between the rear axle 10 and a front axle (not shown) and adapted for supporting a perambulator body in elevated relation to axle 10.

According to the invention, two brake members 18 each is pivotally mounted on a different one of the parts 14' of springs 14, a little forward of the wheels 12. In the preferred form, as represented, the brake members 18 are integral end parts of an integral generally W-shaped bar or rod of stiff metal which is disposed between the wheels 12, extending rearward to a location substantially beyond axle 10 for constituting a safety leg 22 whose engaging parts 22' stand only slightly elevated above the ground or floor when the brake members 18 are applied to the wheels as best seen in Fig. 1.

The generally W-shaped bar, besides constituting, in its depressed position, a safety leg 22 for preventing backward tipping of the perambulator, serves also as an actuator by which the brake members 18 may be forcibly applied to wheels 12 by foot depression of the bridge end of the W-bar at the rear of the perambulator. The bridge of the W-bar extends angularly from the engaging parts 22' of the safety leg 22, and has short horizontal extent at 24 which constitutes a bearing for pivotally mounting a latch member indicated generally at 26.

It is a feature of the invention that the safety leg 22 and brake members 18 may be entirely free of holes and economically may be formed by bending an initially straight bar of metal which conveniently may be cross-sectionally round, as shown. The opposite ends of the W-bar have their brake members 18 axially aligned and generally in parallelism with the axle 10, and each brake member extends integrally into a relatively short generally right-angularly related portion 18' of the bar which extends to the adjacent pivot 20 where it turns sharply outward to provide a bearing part 21 which is rotatably secured by a bearing bracket 23 to the under side of one of the forwardly extending spring parts 14', a little forward of the adjacent wheel 12. The bearing parts 21 at opposite sides of the vehicle have their axes generally aligned with each other, in general parallelism with axle 10, so that rotation of these bearing parts 21 causes the brake members to swing toward or away from the peripheries of wheels 12. Referring to Fig. 1, it will be observed that the brake members 18, when in engagement with wheels 12, are disposed relative to the pivots 20 so that any force applied to the vehicle tending to rotate wheels 12 in direction to move the vehicle forward, acts to enhance the gripping action of the brake members on wheels 12.

The main portion of the generally W-shaped safety leg 22 has substantial extent rearward between wheels 12 from the pivots 20 so that the side arms of the W-shaped leg constitute relatively long arms of levers which have the short arms 18' carrying the brake members 18. Hence, a force applied to the generally W-shaped safety leg 22 to swing it from its brake-release position of Fig. 2 to its depressed braking position of Fig. 1 is greatly magnified at the regions of engagement of brake members 18 with the wheels 12, and the springs 28 oppose such a movement of the leg 22 and tend to return the leg 22 to its position of Fig. 2, with brake members 18 disengaged.

However, according to the invention, the actuating latch member 26 acts, under the influence of gravity, to automatically latch the leg 22 in its depressed position, with the brake members 18 strongly applied to the wheels, whenever the leg 22 is moved to its depressed position of Fig. 1.

To this end, the latch member 26 may be a unitary integral strip of stiff metal pivotally secured, as by bearing bracket 25, to the central bearing part 24 of the bridge of the generally W-shaped safety leg 22, with the pivotal bearing rearward of axle 10 so that the strip extends obliquely upwardly and forwardly from the bearing at 24 to rest by gravity on the axle at a central region therealong between the wheels 12. The strip is formed with the latching shoulder 30 for engaging under the axle 10, as in Fig. 1, and adjacent shoulder 30 is formed as an annular loop 32 having the generally vertical wall 34 rising from the shoulder 30, for engaging the rear surface of axle 10, the generally horizontal wall 36 for engaging the top surface of the axle, and the longer inclined wall 38 extending from wall 36 generally parallel with the main oblique portion of the strip and in spaced relation thereto, with the lower end portion of wall 38 secured as at 40 to the main oblique portion of the strip. A pedal 42, or the like, is provided on the other side of pivotal bearing 24, extending rearward, for convenient actuation of the latch by the foot of the person operating the perambulator. Also, this pedal 42 may be engaged by a foot to depress the safety leg 22 from its position of Fig. 2 to its position of Fig. 1.

Figure 2:
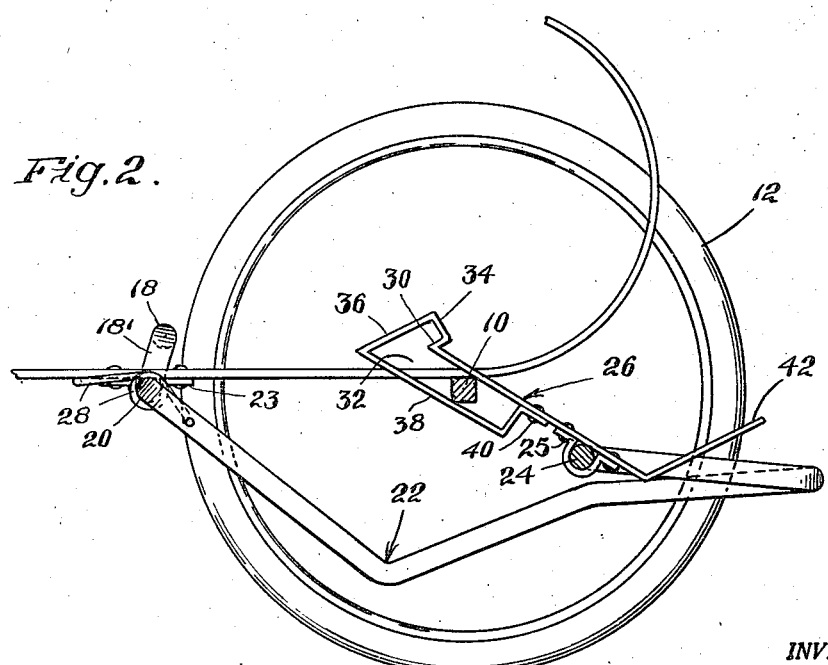
Fig. 2 is a view similar to Fig 1 but showing the positions of parts when the brake is out of engagement with the wheel.
Figure 3:
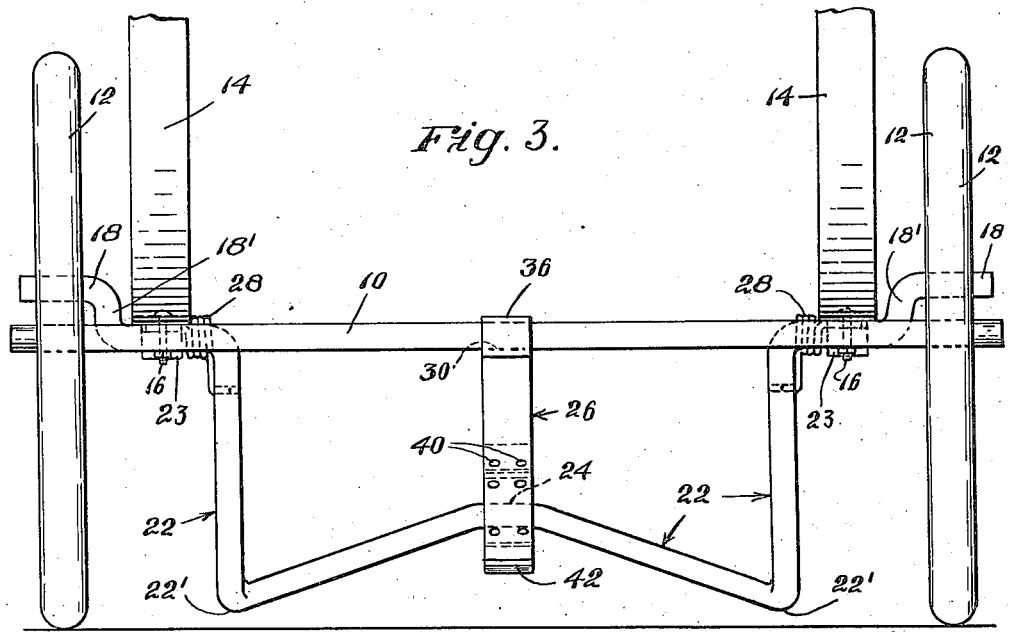
Fig. 3 is a rear elevation of the perambulator chassis as shown in Fig 1.
Figure 4:
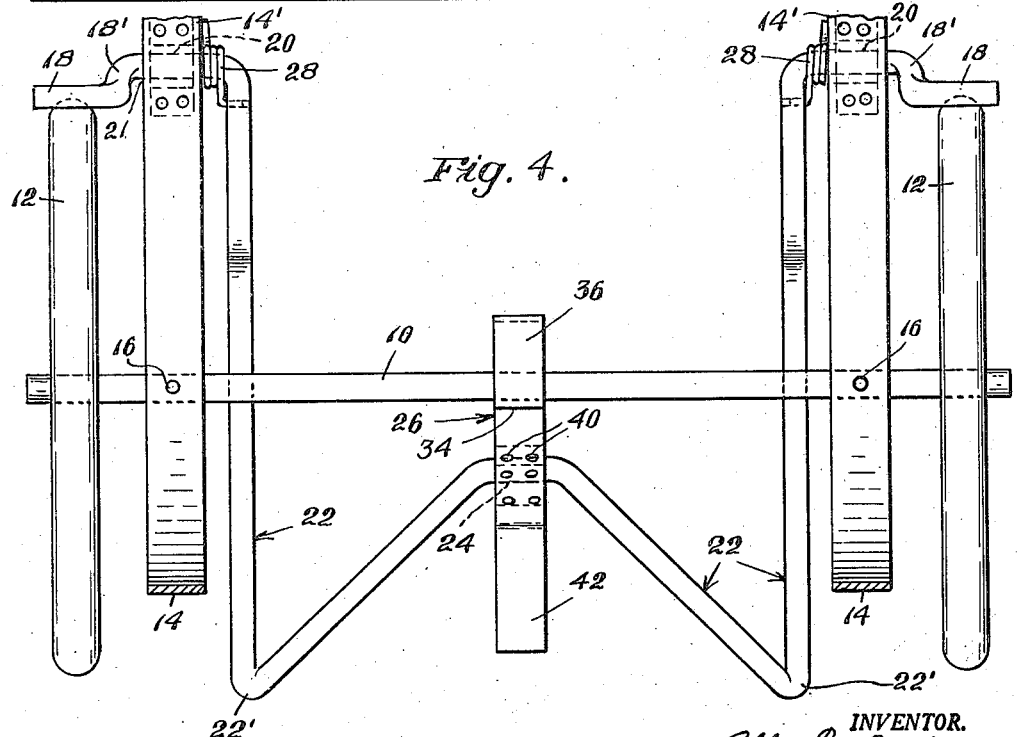
Fig. 4 is a top plan view of the perambulator chassis as shown in Fig. 1.

When the brake is engaged, as in Fig. 1, the safety leg 22 is in depressed position with its engaging parts 22' spaced a little above the ground or floor so that they effectively can prevent any tipping of the vehicle backwards. A mere toe-depression of the pedal 42 will swing the latch member 26 about pivotal bearing 24 in direction to release the latching shoulder 30 from under axle 10, after which the springs 28 swing the safety leg 22 upward to its position of Fig. 2, with simultaneous release of brake members 18. As the leg 22 swings upward, the latch member 26 is slid relative to axle 10 with the axle engaged in the angular loop 32. The walls of the loop engaging the axle ultimately stop the movement of the latch member and of the leg 22 approximately in their positions as represented in Fig. 2. The movement may be relatively small because the brake members 18 need only to clear the peripheries of wheels 12.

To apply the brake, the operator merely steps on a convenient rearwardly projecting portion of the safety leg frame 22 in the Fig. 2 position and depresses it to the Fig. 1 position, with the latch member 26 riding on axle 10 until the latching shoulder 30 reaches a position to engage, by gravity, under the axle, as in Fig. 1.

I claim as my invention:

1. In a vehicle having an axle and a pair of wheels thereon, a brake member pivotally mounted adjacent to the periphery of a said wheel and swingable about its pivot into and out of engagement with the periphery of said wheel, and means rigid with said brake member and extending thence across the vertical plane of the axle to a location substantially beyond the axle, for constituting a safety leg against tipping of the vehicle when said brake member is engaged with a said wheel, means biasing said brake member in direction away from wheel engagement and biasing said safety leg to an elevated position, said safety leg being depressible in opposition to said bias to forcibly apply said brake member to a said wheel and to position said leg for preventing tipping of the vehicle, and means operative in response to a depressing of said safety leg for releasably securing the safety leg in its depressed position.

2. In a vehicle having an axle and a pair of wheels thereon, a combined brake member and safety leg comprising a stiff lever pivotally mounted adjacent to the periphery of a said wheel and having a relatively short arm movable about said pivot into and out of engagement with the periphery of the adjacent wheel, and having a relatively longer arm extending across the vertical plane of the axle to a location substantially beyond the axle for constituting a safety leg against tipping of the vehicle when said shorter arm of the lever is in engagement with a said wheel, means biasing the lever about its pivot in direction to move its shorter arm away from wheel engagement and its longer arm to an elevated position, said longer arm being depressible in opposition to the said bias to forcibly swing the shorter arm into braking engagement with the wheel and to position the longer arm for preventing tipping of the vehicle, and latch means coacting with said axle and operative in response to a depressing of said longer arm of the lever, for releasably securing said longer arm in its depressed position, said latch including depressible means for releasing the latch.

3. In a vehicle having a rear axle with a pair of rear wheels thereon, a combined brake and safety leg comprising a stiff member pivotally mounted forward of said axle for swinging on an axis parallel with the axle and having a pair of brake arms at one side of the pivotal axis movable about said pivotal axis into and out of braking engagement with the peripheries of said wheels, and having a portion at the other side of said pivotal axis and extending rearward to the other side of said axle for constituting a safety leg against backward tipping of the vehicle, means biasing said stiff member about its said pivotal axis in direction to move said brake arms out of wheel engagement and to move said safety leg to an elevated position, said safety leg being depressible in opposition to said bias to forcibly apply said brake arms to the wheels, latching means pivoted on said safety leg and coacting with said axle for releasably latching said safety leg in depressed position in response to a depressing thereof, and depressible means on the latch for releasing the latch.

4. In a vehicle having a rear axle with wheels thereon and spaced side members extending forward from the rear axle, a brake arm pivotally mounted on each of said side members forward of said axle, each of said brake arm being swingable into and out of braking engagement with an adjacent wheel, means biasing said brake arms out of wheel engagement, and means extending from said brake arms rearward to beyond said axle and depressible at the rear of the vehicle for swinging said brake arms into braking engagement with said wheels in opposition to said bias, and means for releasably securing said rearwardly extending means in a depressed position.

5. In a vehicle having a rear axle with wheels thereon and spaced side members extending forwardly from said axle, a generally W-shaped stiff frame pivotally mounted on said side members with the pivotal axis of the frame forward of said axle and with the free ends of the W-arms each extending forward of the periphery of the adjacent wheel and each swingable into and out of braking engagement with the adjacent wheel, said W-arms extending from said pivotal axis rearward below said axis with the bridge end of the W-frame a substantial distance rearward of said axis, means biasing said frame about its pivotal axis in direction to move said free ends of the W-arms out of engagement with said wheels, said bridge end of the W-frame being depressible at the rear of the vehicle for forcibly moving said free ends of the W-arms into braking engagement with the wheels in opposition to said biasing means, and latch means for releasably securing the bridge end of the frame in depressed position.

6. In a vehicle having a rear axle with wheels thereon and spaced side members extending forwardly from said axle, a generally W-shaped stiff frame pivotally mounted on said side members between the wheels with the pivotal axis of the frame forward of the peripheries of said wheels and with the free ends of the W-arms disposed in general parallelism with the axle and constituting brake members movable into and out of braking engagement with said wheels, said W-arms also extending rearward from said pivotal axis with the bridge end of the W-frame at a location a substantial distance rearward of said axle and movable about said pivotal axis between an elevated position and a depressed safety position in which latter it prevents backward tipping of the vehicle, means biasing the frame about its pivotal axis in direction to move said brake members out of wheel engagement and said bridge end of the frame to its elevated position, and a latch coacting with said axle and responsive to depression of said bridge end of the frame for releasably securing said bridge end of the frame in its depressed safety position with said brake members forcibly applied to said wheels.

7. In a vehicle having a rear axle with wheels thereon, a generally W-shaped frame arranged between the wheels with the free ends of the W-arms forward of the wheels and with the bridge end of the W-frame rearward of said axle, means pivotally mounting the W-frame on a pivotal axis forward of said axle with the free end portions of the W-arms movable about said pivotal axis into and out of braking engagement with said wheels in response to movements of the bridge end of the W-frame, means biasing the W-frame about said pivotal axis in direction to move said free end portions of the W-arms out of wheel engagement thereby to elevate the bridge end of the W-frame, and a latch pivoted on the bridge of the W-frame and adapted to ride on said axle during movements of the W-frame and to engage said axle to latch the W-frame whenever the bridge end of the W-frame is depressed from its elevated position to a brake applying safety position.

8. In a vehicle having a rear axle with wheels thereon, a generally W-shaped frame arranged between the wheels with the free ends of the W-arms forward of the wheels and with the bridge end of the W-frame rearward of said axle, means pivotally mounting the W-frame on a pivotal axis forward of said axle, the free end portions of the W-arms, forward of the wheels, being formed with brake members movable into and out of braking engagement with said wheels in response to movements of the bridge end of the W-frame between an elevated position and a depressed brake-applying safety position, means biasing the W-frame about its pivotal axis in direction to move said brake members out of wheel engagement and the bridge end of the W-frame to its elevated position, a latch pivoted on the bridge of the W-frame and adapted to ride on said axle during movements of the W-frame and to engage said axle to latch the W-frame whenever the bridge end of the W-frame is depressed to its said brake-applying safety position, and means associated with said latch responsive to foot depression for depressing the bridge end of the W-frame and also responsive to foot depression for releasing said latch.

ALBAN M. BOUDREAU.

REFERENCES CITED

The following references are of record in the file of this patent:

UNITED STATES PATENTS

| Number | Name | Date |
| --- | --- | --- |
| 1,915,286 | Bleustein | June 27, 1933 |
| 2,250,990 | Feldman | July 29, 1941 |

FOREIGN PATENTS

| Number | Country | Date |
| --- | --- | --- |
| 247,727 | Great Britain | Feb. 25, 1926 |